(12) United States Patent
Attar et al.

(10) Patent No.: US 7,467,186 B2
(45) Date of Patent: Dec. 16, 2008

(54) INTERACTIVE METHOD OF COMMUNICATING INFORMATION TO USERS OVER A COMMUNICATION NETWORK

(75) Inventors: Oussama Attar, Asniere (FR); Marc Blaise, Nanterre (FR); Marc DeLafosse, Paris (FR); Michel Delafosse, Paris (FR)

(73) Assignee: Cyber Act, Paris (FR)

( * ) Notice: Subject to any disclaimer, the term of this patent is extended or adjusted under 35 U.S.C. 154(b) by 810 days.

(21) Appl. No.: 10/381,733

(22) PCT Filed: Sep. 26, 2001

(86) PCT No.: PCT/FR01/02977

§ 371 (c)(1),
(2), (4) Date: Aug. 21, 2003

(87) PCT Pub. No.: WO02/27567

PCT Pub. Date: Apr. 4, 2002

(65) Prior Publication Data

US 2004/0030596 A1    Feb. 12, 2004

(30) Foreign Application Priority Data

Sep. 27, 2000    (FR) .................................. 00 12284

(51) Int. Cl.
*G06F 15/16* (2006.01)
(52) U.S. Cl. ........................ 709/204; 709/217; 709/219; 725/37; 725/41; 725/43; 725/47; 725/61
(58) Field of Classification Search ................. 709/203, 709/204, 211, 217, 219, 231, 250; 725/37, 725/41, 43, 47, 61
See application file for complete search history.

(56) References Cited

U.S. PATENT DOCUMENTS 5,347,306 A    9/1994    Nitta (Continued)

FOREIGN PATENT DOCUMENTS

EP    0 562 995 A2    9/1993

(Continued)

OTHER PUBLICATIONS

Matthew Turk, "Visual Interaction With Lifelink Characters", Proceedings of the Second International Conference on Automatic Face and Gesture Recognition (Cat. No. 97TB100079), Proceedings of the Second International Conference on Automatic Face and Gesture Recognition, Killington, VT, USA 14-16, 368-373 (Oct. 1996).

(Continued)

*Primary Examiner*—William C. Vaughn, Jr.
*Assistant Examiner*—Mohamed Ibrahim
(74) *Attorney, Agent, or Firm*—Fulbright & Jaworski LLP

(57) ABSTRACT

The invention concerns an interactive method for communicating data to users (1) of a communication network (3). Each user (1) is provided with a computer equipment (2) connected to the electronic communication network (3). The method uses at least a virtual object (6). Said method comprises the following steps which consist in: distributing, via the communication network (3), data enabling the computer equipment (2) to display fixed and/or animated images (10) and/or to compute screen pages (10) and display them; distributing, via the communication network (3), data enabling the computer equipment (2) to compute the virtual object (6) and display it by overstriking on the images and/or the screen pages (10); real remote control of the virtual object (6) and simultaneous animation thereof by an operator (7) independent relative to the images and/or the screen pages (10)

26 Claims, 3 Drawing Sheets

U.S. PATENT DOCUMENTS

| | | | | |
|---|---|---|---|---|
| 5,706,421 | A * | 1/1998 | Reber et al. | 345/473 |
| 5,938,724 | A * | 8/1999 | Pommier et al. | 709/205 |
| 5,983,190 | A | 11/1999 | Trower, II et al. | |
| 6,088,731 | A | 7/2000 | Kiraly et al. | |
| 6,288,753 | B1 * | 9/2001 | DeNicola et al. | 348/586 |
| 6,289,165 | B1 * | 9/2001 | Abecassis | 386/46 |
| 6,347,333 | B2 * | 2/2002 | Eisendrath et al. | 709/217 |
| 7,168,084 | B1 * | 1/2007 | Hendricks et al. | 725/42 |
| 2002/0059376 | A1 * | 5/2002 | Schwartz | 709/204 |
| 2006/0200253 | A1 * | 9/2006 | Hoffberg et al. | 700/19 |

FOREIGN PATENT DOCUMENTS

WO     WO-97/35180 A2     9/1997

OTHER PUBLICATIONS

Christopher Richard Wren et al., "Pfinder: Real-Time Tracking of the Human Body", IEEE Transactions on Pattern Analysis and Maching Intelligence, IEEE Inc., New York, US, vol. 19, No. 7, 780-785 (Jul. 1997).

DM Traill et al., "Interactive collaborative media environments", BT Lab, US, vol. 15, No. 4, pp. 130-139 (Oct. 1997).

* cited by examiner

INTERACTIVE METHOD OF COMMUNICATING INFORMATION TO USERS OVER A COMMUNICATION NETWORK

BACKGROUND OF THE INVENTION

The present invention concerns an interactive method for communicating data to users of a communications network. In the meaning of the present invention, "communications networks" refer particularly to telephone networks, telecommunications network or inter-company or intra-company connections transmitting sound and/or still backgrounds and/or animated images and/or data. Communications network in the meaning of the present invention also refers to informational communications networks, particularly of the Internet type.

The inventors have found that the new technologies are leading companies or organizations to maintain relations with their clients or partners in increasingly impersonal ways. As technology advances, particularly with the development of the Internet, relations become impersonal.

For example, when a person enters a store, the most elementary courtesy is to say "Hello" to him, to inquire about his needs and to try to meet them. On the Internet, this kind of relationship does not exist. There are no ways to offer help to users having problems in searching or in using the information distributed through Internet type communications.

SUMMARY AND OBJECTS OF THE PRESENT INVENTION

Today a few more or less intelligent automatic systems have come to light. However, no operator has yet set up a complete system aimed at humanizing relations between operators and users, using the new means of communication, particularly the Internet. No system makes it possible to provide users with personalized assistance.

The present invention solves this problem by applying a solution that is both interactive and friendly.

It concerns an interactive method for communicating information to users of a communications network. Each user (or group of users) has a computer connected to the communications network. The method makes use of at least one virtual object.

The method comprises the step of distributing data via the network, which enables the computer to display still and/or animated images and/or to process screen pages and display them.

The method comprises the step of broadcasting via the communications network data enabling the computer to process the virtual object and display it superimposed on the still and/or animated images and/or on the pages displayed on the monitor.

The method furthermore comprises the step wherein the user and/or an operator animates the virtual object.

The method furthermore includes a step in which an operator remotely controls the virtual object in real-time and animates it in a simultaneous and in an independent manner with respect to the images and/or to the display.

Preferably the method furthermore includes the step of capturing an audiovisual sequence of the user.

Preferably the method furthermore comprises the step of issuing and transmitting the audiovisual sequence to the operator via the communications network.

Thus, the operator can observe the user (or group of users) and analyze their actions.

Advantageously, the method furthermore comprises the step of hearing the questions asked by the user.

Advantageously, the method furthermore comprises the step of issuing and transmitting to the operator the questions submitted by the user, via the communications network.

The operator can thus listen to the user (or group of users) and analyze their actions.

Preferably, the method furthermore includes the step of hearing the voice data given by the operator and intended for the user.

Preferentially, the method furthermore comprises the step of issuing and transmitting to the user the voice information issued by the operator via the communications network.

Thus, the user (or group of users) can listen to the information supplied by the operator.

Preferably, the method furthermore comprises the stage of issuing and transmitting to the operator, via the communications network, a copy of the still and/or animated image or of the screen displayed by the user.

Thus, the operator can likewise process the still and/or animated image or the screen displayed by the user (or group of users).

Preferably, the method furthermore comprises the step of assisting the operator with artificial intelligence (particularly associated with verbal search processes) which can replace him entirely or partially.

Preferably, the method furthermore includes the step of connecting the operator to at least one data base containing multimedia information, particularly: text, images, sounds, videos, and 3-D animation sequences.

The operator can thus answer questions asked by the user and can send the user the information he needs.

Preferably, the virtual object appears in the form of a stylized graphic personage in 3 dimensions.

Preferably, the step, for the operator, of controlling and animating the graphic personage includes the step of animating him to symbolize particularly a product, a service, a trademark, a business or an organization for which the graphic personage has the particular purpose of informing, interesting or selling.

Preferably, the step, for the operator, of controlling and animating the graphic personage includes the step of providing the graphic personage with graphic expressions, particularly animation of his lips and eyes, as well as vocal expressions, particularly inflections. The expressions express the reactions of the personage in relation to the action, needs and expectations of the user.

Preferably, the step, for the operator, of controlling and animating the graphic personage includes the step of shifting him on the fixed or moving background or on the screen page, the step of changing his size, his shapes and his color, the step of providing him with gestures, movements of the head, the arms and the legs. The factors of mobility, size and gesticulation have a particular relationship to the areas of the still and/or animated image or of the screen page and the contextual situation between the user and the operator for whom the personage is acting.

Preferably, the step, for the operator, of controlling and animating the graphic personage includes the step of adding accessories, depending on the unfolding of the contextual situation, by means of which the operator completes the expressions and the factors of movement, size and gestures.

Preferably, the step, for the operator, of controlling and animating the graphic personage includes the step of animating the graphic personage to activate the areas of the still and/or animated images and/or screen pages which can be actuated.

Preferably, the operator is located in a call center and/or at his home. It is thus possible to interconnect the human resources and the skills by assigning them and involving them simultaneously or alternatively with a number of users.

The invention likewise concerns interactive data communication with users of a communications network. Each user (or group of users) has a computer connected to the communications network. The system employs at least one virtual object.

The system includes a first server connected to the computers of each user (or group of users) via the communications network. The first server distributes data enabling the computer to display still and/or animated images and/or to process screen pages.

The system comprises a second server connected to the computer equipment of each user via the communications network. The second server distributes data enabling the computers to process the virtual object.

The virtual object is animated by an operator by means of a controlling computer associated with the second server and/or by the user of at least one control device associated with the computer he has available. The virtual object is remotely controlled in real-time by the operator, by means of the control computer associated with the second server.

The computer of each user includes means for the display of the still and/or animated screen pages on the one hand, and on the other hand for the display of the virtual object. The virtual object is displayed superimposed on the still and/or animated images and/or screen pages. On the one hand, the still and/or animated images and/or the screen pages, and on the other hand the virtual object, are animated simultaneously and independently by the first server and by the control computer associated with the second server.

Preferably, the user's computer is connected to a camera to capture the user's audiovisual sequence. The user's computer comprises output means for transmitting the audiovisual sequence to the operator's control computer via the communications network. The operator's control computer comprises means for displaying the visual sequence.

Thus, the operator can observe the user and analyze what he is doing.

Advantageously, the user's computer equipment is connected to a microphone to pick up the questions the user asks. The user's computer equipment includes transmission means for transmitting his questions to the operator's control computer via the communications network. The operator's control computer has a loudspeaker enabling the operator to hear the questions asked by the user.

Preferably, the operator's control computer is connected to a microphone to pick up the voice data provided by the operator and intended for the user. The operator's computer comprises transmission means to send the voice data to the user's computer equipment via the communications network. The user's computer equipment contains a loudspeaker enabling the user to hear the voice data transmitted by the operator.

Preferably, the user's computer equipment includes transmission means for transmitting a copy of the still and/or animated image and/or the screen page created by the user to the operator's control computer. The operator's control computer contains means for displaying the still and/or animated image and/or the screen page.

The operator can thus likewise scan the still and/or animated image and/or the screen page displayed by the user.

Preferably, the operator can be aided by an artificial intelligence which can replace him entirely or partially.

Preferably, the operator's control computer is connected to at least one data base containing multimedia data, particularly text, images, sounds, videos, and 3-D animation sequences.

Thus the operator can answer questions asked by the user and can transmit to the user the data he needs.

Preferably, the virtual object appears in the form of a stylized graphic personage in 3 dimensions.

Preferably, the personage symbolizes particularly a product, a service, a brand, a business or an association for which he performs the service of informing, animating or selling.

Preferably, the personage is provided with graphic expressions, particularly of the lips and the eyes, vocal expressions, and particularly intonations.

His expressions are controlled and produced by the operator and express the personage's reactions to the actions, needs and expectations of the user.

Preferably, the personage controlled by the operator is mobile on the still and/or animated and/or on the display, is of variable size, shape and color, performs gestures, particularly head, arm and leg movements.

The movement, size and gesticulation factors are in relation particularly to the areas of the still and/or animated image and/or of the screen page and the contextual situation between the user and the operator on whose behalf the character is acting.

Preferably, the personage has accessories controlled by the operator in relation to the situation, by means of which the operator carries out the expressions and the factors of motion, size and gesture.

Preferably, the personage includes activation means for operating the movable parts of the still and/or animated images and/or screen pages. The activation means are controlled by the operator.

BRIEF DESCRIPTION OF THE DRAWINGS

Preferably, the control computer associated with the second server is situated in a call center and/or in the operator's home. It is thus possible to co-ordinate the human resources. The control computer is designed so that the operator can take part simultaneously or alternatively in a plurality of users.

Other features and advantages of the invention will appear upon reading the description of various embodiments of the invention, which are given by way of suggestion without limiting them, namely.

DETAILED DESCRIPTION OF THE EMBODIMENTS

Figure 2:
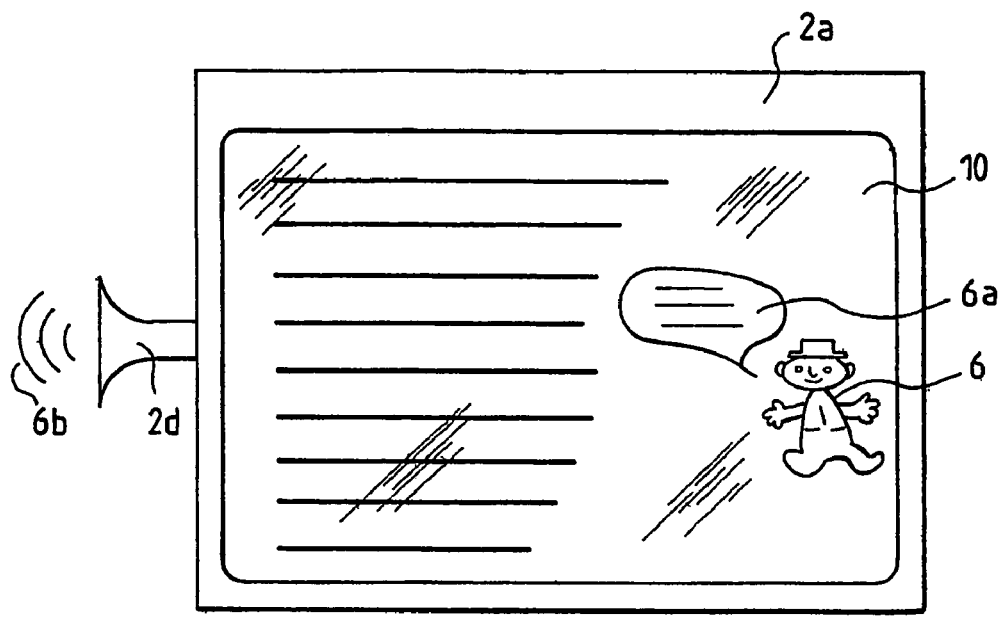
FIG. 2 representing the still background as a user will see it, before the virtual object is employed, FIG. 3 representing a still background as a user will see it, during the employment of the virtual object, and FIG. 4 representing a still background as an operator sees it, during the employment of the virtual object.
Figure 3:
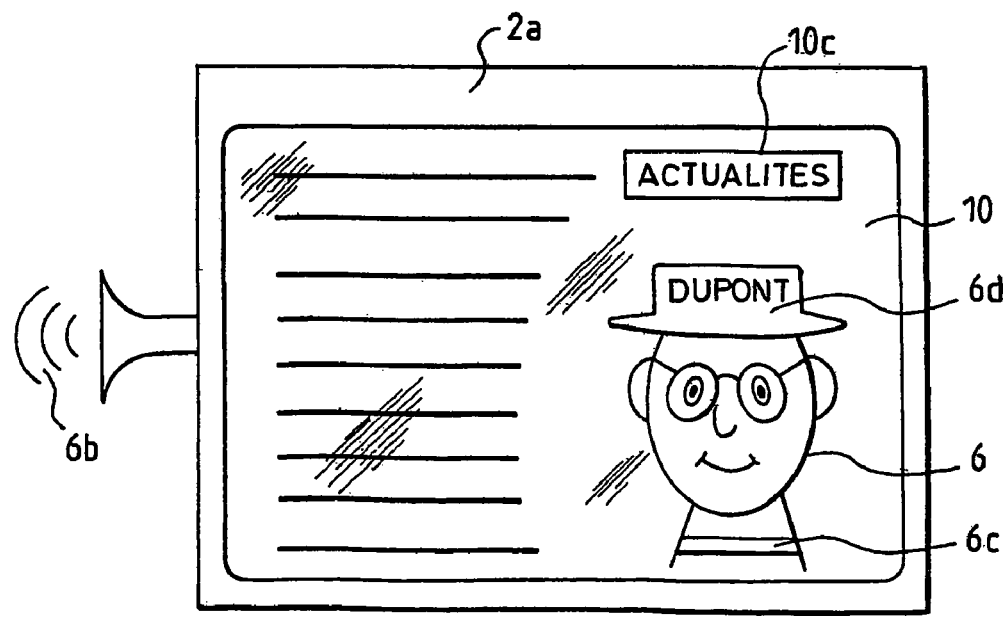
Figure 4:
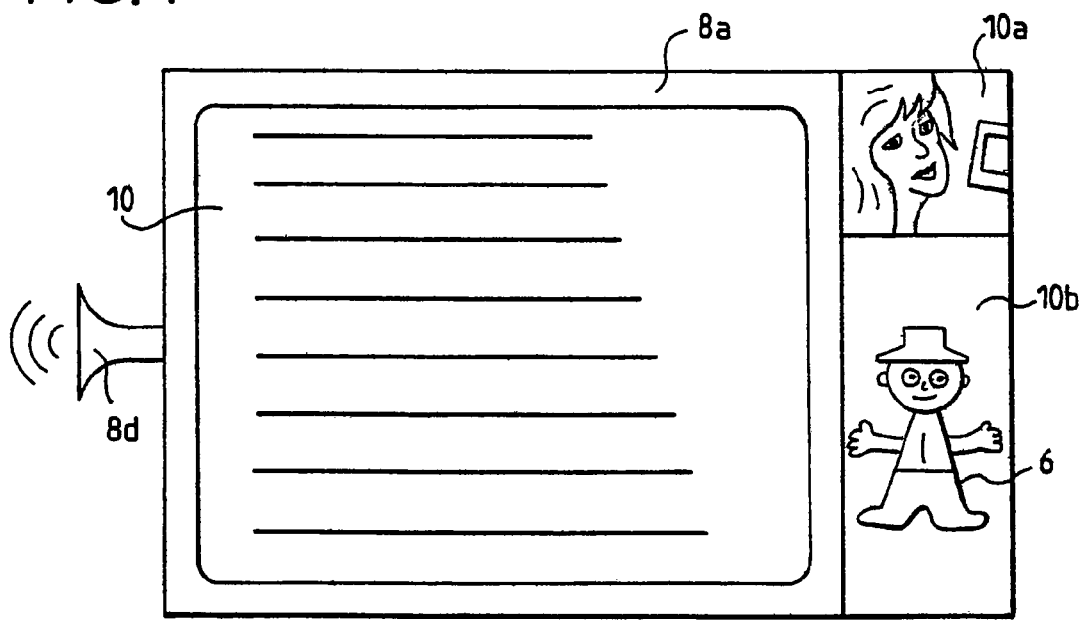

First of all, FIG. 1 will be described which permits an understanding of the operation of the system overall. The term, "user," refers to the personage or personages who interact with the virtual object. The virtual object can be a symbolized virtual personage behaving like a human being. The term, "operator," refers to the physical personage or personages who perform the operations of animation (initiating actions, displaying visuals, dialog with the user). FIGS. 2, 3 and 4 will offer a more detailed representation of the same still background, as it is seen by a user or by an operator.

Figure 1:
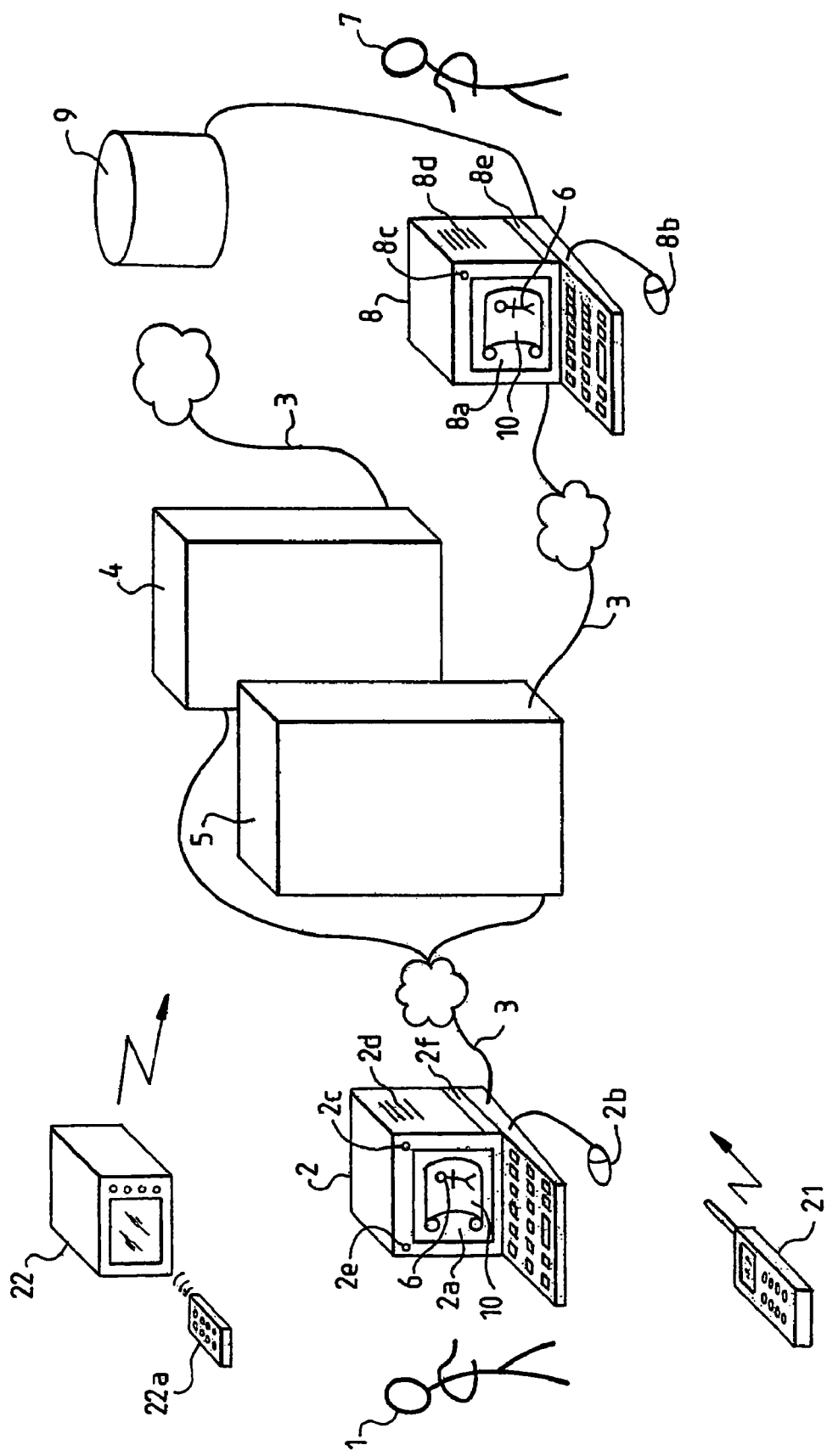
FIG. 1 representing an overall schematic view of the system of the invention.

FIG. 1 represents an overall view of the system according to the invention. A user 1 has a computer 2. The computer 2 comprises particularly a monitor 2a, a control device, particularly a mouse 2b or a key for navigating a menu, a microphone 2c, a loudspeaker 2d, and a modem. Advantageously, the computer contains a camera 2e. The computer 2 is connected to a communications network 3. A first server 4 is connected to the computer of user 1 via the communications network 3. The first server 4 issues data enabling the computer 2 to display still and/or animated images 10 on the monitor 2a. The still and/or animated images 10 come from image servers. They can be particularly screen pages 10 originating from servers of Internet sites of any kind. A second server 5 is connected to the computer 2 of the user 1 via the communications network. The second server puts out data enabling the computer 2 to process a virtual object 6 appearing on the display screen 2a of the computer 2. The virtual object 6 is remotely controlled in real-time by an operator 7 by means of a control computer 8 associated with the second server 5. The control computer of the operator 7, like computer 2, comprises particularly a display screen 8a, a control device, particularly a mouse 8b or a key for navigating a menu, a microphone 8c, a loudspeaker 8d. The still and/or animated images 10 and the virtual object 6 are animated simultaneously and independently. The still and/or animated images 10 are animated by the first server 4. The virtual object 6 is animated by the control computer 8 associated with the second server 5. The computer 2 of user 1 contains transmission means 2f for transmitting a copy of the still background 10 seen by the user 1, to the control computer 8 of the operator 7, via the communications network 3. The operator 7 sees the still background 10 seen by the user 1 on the display monitor 8a of his control computer 8. The operator 7 can thus scan the still background 10 seen by the user 1. The camera 2a and the microphone 2c of the computer 2 of user 1 make it possible to view an audiovisual sequence of user 1. The transmission means 2f of computer 2 of user 1 transmits the audiovisual sequence thus detected to the control computer 8 of operator 7 via the communications network 3. Operator 7 views the visual sequence on the display screen 8a of the control computer 8. The operator can thus observe the user 1 and analyze his actions. The microphone 2c of the computer 2 of user 1 permits the questions posed by user 1 to be heard. The transmission means 2f of the computer 2 of user 1 transmits the questions asked by the user 1 to the control computer 8 of operator 7 through the data communications network 3. The loudspeaker 8d of the control computer 8 of the operator 7 enables the operator 7 to hear the questions asked by the user 1. The microphone 8c of the control computer 8 of operator 7 picks up the voice data given by operator 7 and intended for the user 1. The computer 8 of operator 7 includes emission means 8e for transmitting the voice data to the computer 2 of user 1 via the communications network 3. Through the loudspeaker 2d of his computer 2 the user 1 hears the voice data given by operator 7. The control computer 8 of operator 7 is connected to at least one database 9. The database 9 contains multimedia data, especially text, images, sound, videos, and 3D animation sequences. The operator 7 can thus answer the questions asked by user 1 and can send him the information he needs. Thus, the operator 7 can not only provide user 1 with assistance in real-time, but also he can send him multimedia data yielded by the data bases to which he has access.

The computer equipment can also be in the form of a mobile telephone 21 or a television camera 22 and its remote control 22a.

In FIG. 2 there is shown a fixed image 10 such as the user 1 sees it before the virtual object 6 is deployed. As it has been mentioned above, this still background 10 is broadcast by the first server 4. In this instance a still background 10 broadcast by the Dupont® website is shown containing data relating to a commercial offer of data processing equipment. The virtual object 6 appears in the form of a stylized three-dimensional graphic personage. The personage 6 symbolizes a product, a service, a brand, a business or an association for which he has the mission of informing, promoting or selling. The personage 6 is given graphic expressions, especially of the lips and eyes, vocal expressions, especially inflections. The personage 6 is seen by user 1 superimposed on the still background 10. The personage 6 offers assistance to user 1 by means of a textual message 6a and/or a voice message 6b associated with him, the content of which is, for example: "I am at your service to assist you." When he is not animated by the user 1, the personage 6 remains in a waiting position, for example, as he has been drawn on the right side of the viewscreen 2a. When he wishes to ask the assistance of the personage 6, the user 1 animates the personage 6 with a control means, particularly a mouse 2b or a key for navigation in a menu associated with his computer 2. To animate the personage 6, the user clicks on a control means, particularly a mouse 2b or a key for navigation in a menu.

FIG. 3 shows the still background 10 as the user 1 sees it when the personage 6 has been animated. The personage 6 no longer stays in the waiting position but begins to move. The expressions of personage 6 are controlled and produced by operator 7 and express the reactions of the personage 6 to the actions, needs and expectations of the user 1. The personage 6, controlled by the operator 7, is capable of movement on the still background 10, and is variable in size, shape and color, and provided with gestures, particularly head, arm and leg movements. The factors of movement, size and gesture have a particular relationship to areas of the still background 10 and the contextual situation between user 1 and operator 7 by which the personage 6 is acting. The personage 6 has accessories controlled by the operator 7 according to the development of the contextual situation, by means of which the operator 7 carries out the expressions and the factors of movement, size and gesture. It can thus be observed in FIG. 3 that the personage 6 is wearing a hat 6d in the colors of the Dupont® trademark. Here the personage 6, remotely controlled by operator 7, instructs the user 1 in the procedure to follow to access the "What's New" department of the ® Internet website. Through the communications network 3 and as described above, the operator 7 transmits to user 1 the following voice message: "Click on 'What's New' just above my hat." The user 1 is thus invited to click with a control means, particularly a mouse 2b or a key for navigation in a menu 2b, on the "What's New" link 10c. The personage 6 also has means 6c for activating the action areas of the still background 10. The term, "action areas," is understood to mean the hypertext links on the still background or animated image by means of which the user 1 can access the other still and/or animated images of the server he is consulting or of other servers of Internet sites. The means 6c are controlled by the operator 7. Thus, in case the user 1 does not manage to click by himself on the "What's New" link 10c, the personage 6, remotely controlled in real-time by operator 7, can click in his place on the link in question, 10c. The assistance provided to the user 1 is therefore variable. The operator 7 personalizes it and adapts it to his needs in real-time.

In FIG. 4 there is shown the image 10 as the operator 7 sees it, when the personage 6 has been animated. The operator 7 sees on the left side of his viewscreen 8a the image 10 which the user 1 sees on his viewscreen 2a. The right side of the viewscreen 7 of operator 7 is divided into two parts. In the upper part is a section 10a enabling the operator 7 to observe the image of user 1 captured by the camera 2e. In the lower part is an area 10b for control of the movements of the personage 6. Through this area 10b the operator 7 sees and controls the animation which he gives in real-time to the personage 6. The loudspeaker 8d enables the operator 7 to hear the questions asked by the user 1 which are picked up by the microphone 2c. The interaction between operator 7 and user 1 is thus carried on in real-time.

According to a variant embodiment of the invention, the operator 7 can be assisted by an artificial intelligence. This artificial intelligence, which can replace him entirely or partially, can advantageously resort to voice recognition techniques. In a case in which an artificial intelligence replaces the operator 7 entirely, the actions (movements, expressions and reactions) of the personage 6 are carried on in a predetermined manner, according to pre-established scenarios. The actions of the user are no longer followed in real-time by an operator who is a physical personage. They are analyzed, particularly by means of a voice recognition module.

The operator 7 is shown alone in FIG. 1. The use of several operators, particularly grouped in one or more call centers, does not depart from the invention.

If it is at all necessary, the present description can be summed up by recalling that the technical means according to the invention make it possible:

for the operator:
to see and hear the user, and consequently to converse with him in real-time,
to display still or animated images which will meet the expectations expressed by the user,
to animate the virtual personage so that he behaves like a human being according to the situations encountered, for the user:
to see and hear the operator, represented graphically by the virtual personage and to converse with him in real-time,
to see the still or animated images which responds to the needs he has expressed.

The process according to the invention permits the creation of a conversation between users and a virtual personage in 3D by using telephone or data processing means of communication to carry the data necessary for the operation of the process, particularly those which make it possible for the virtual personage to compute, control and display the said virtual personage on a viewscreen in a simultaneous manner and independently of other still or animated displays. The operations of computing, controlling and displaying are controlled in real-time by one or more physical personages.

According to the wishes expressed by the user or the objectives assigned to the virtual personage, the operator starts the display of images (still or animated). According to another embodiment, the starting up of the system and the display of the still or animated images can be performed by the user's initiative.

The invention claimed is:

1. Interactive method of communicating information to users over a communications network, each user having a computer connected to said communications network, comprising the steps of:
broadcasting, via said communications network, data enabling said computers to display or process images to be viewed by users, said images comprising at least one of the following: still images, animated images or screen pages;
broadcasting, via said communications network, data enabling said computers to process and display at least one virtual object superimposed on said images;
animating said at least one virtual object on a computer associated with a user by a human operator;
remotely controlling and animating said at least one virtual object in real-time, simultaneously and independently from said images by said human operator to provide said at least one virtual object with graphic and vocal expressions including animation of lips and eyes, intonations, inflections, reactions of said at least one virtual object to actions, needs, and expectations of said user, thereby providing personalized interactions with said user; and
selectively assisting said human operator by artificial intelligence which can replace said human operator entirely or partially, said artificial intelligence controlling actions of said at least one virtual object in a predetermined manner according to pre-established scenarios and analyzing the actions of said user by means of a voice recognition module.

2. The method of claim 1, further comprising the steps of:
capturing an audiovisual sequence of said user; and
transmitting said audiovisual sequence to said operator via said communications network, thereby enabling said human operator to observe said user and analyze user's behavior.

3. The method of claim 1, further comprising the steps of:
capturing questions asked by said user; and
transmitting to said operator said questions asked by said user via said communications network, thereby enabling said human operator to hear said user and analyze user's behavior.

4. The method of claim 1, further comprising the steps of:
capturing voice data issued by said human operator and intended for said user; and
transmitting to said user said voice data issued by said human operator via said, communications network, thereby enabling said user to listen to information supplied by said human operator.

5. The method of claim 1, further comprising the step of transmitting a copy of said images to said human operator, via said communications network, thereby enabling said human operator to process said images viewed by said user.

6. The method of claim 1, further comprising the step of connecting said human operator to at least one database containing multimedia information, wherein said multimedia information comprises at least one of the following: text, images, sound, videos, or 3D animation sequences, thereby enabling said human operator to answer user's questions and transmit information to said user.

7. The method of claim 1, further comprising the step of displaying said at least one virtual object in the form of a stylized graphic personage in three dimensions.

8. The method of claim 7, wherein the step of remotely controlling and animating comprises the step of animating said graphic personage to symbolize product, a service, a brand, a business or an association for which said graphic personage performs the service of informing, promoting or selling.

9. The method of claim 7, wherein the step of remotely controlling and animating comprises the step of animating said graphic personage with graphic expressions including animation of the lips and eyes and with vocal expressions including intonations, said graphic and vocal expressions expressing reactions of said graphic personage to actions, needs and expectations of said user.

10. The method of claim 7, wherein the step of remotely controlling and animating shifts said graphic personage on said images, varies size, shape and color of said graphic personage, and provides said graphic personage with gestures including movements of head, arms and legs based on zones of said images and contextual relationship between said user and said human operator on whose behalf said graphic personage acts.

11. The method of claim 10, wherein the step of remotely controlling and animating comprises the step of adding accessories according to the development of said contextual relationship; and wherein said accessories are used by said human operator to shift and vary said graphic personage, and provide said graphic personage with expressions and gestures.

12. The method of claim 10, wherein the step of remotely controlling and animating comprises the step of animating said graphic personage to activate action areas of said images.

13. The method of claim 1, wherein the step of remotely controlling and animating controls and animates said at least one virtual object by said human operator situated in a call center or said human operator's home.

14. An interactive system for communicating data to users over a communications network, comprising;
   a plurality of computers connected to said communications network, each computer having a control device and being associated with a user;
   a first server connected to said communications network, said first server distributing data enabling said computers to display or process images, said images comprising at least one of the following: still images, animated images or screen pages;
   a second server connected to said communications network, said second server distributing data enabling said computers to process at least one virtual object; and
   a control computer connected to said communications network and associated with said second server; and
   wherein said at least one virtual object is activated on a computer associated with a user by said human operator of said control computer;
   wherein each of said computers comprises visualization means for displaying said images and said at least one virtual object superimposed on said images;
   wherein said control computer is operable by said human operator to remotely control in real-time said at least one virtual object on said computer associated with said user by said human operator;
   wherein said images and said at least one virtual object are animated simultaneously and independently by said first server and said control computer, respectively, to provide said at least one virtual object with graphic and vocal expressions including animation of lips and eyes, intonations, inflections, reactions of said at least one virtual object to actions, needs, and expectations of said user, thereby providing personalized interactions with said user; and
   wherein said human operator is selectively assisted by artificial intelligence which can replace said human operator entirely of partially, said artificial intelligence controlling the actions of said at least one virtual object in a predetermined manner according to pre-established scenarios and analyzing the actions of said user by means of a voice recognition module.

15. The system of claim 14, further comprising a camera connected to said computer associated with said user for capturing an audiovisual sequence from said user; and wherein said computer associated wit said user is operable to transmit said audiovisual sequence to said control computer over the said communications network; and wherein said control computer is operable to display said audio visual sequence to enable said human operator to observe said user and analyze user's behavior.

16. The system of claim 14, further comprising a microphone connected to said computer associated with said user for capturing questions asked by said user; and wherein said computer associated said user is operable to transmit said questions to said control computer over said communications network; and wherein said control computer comprises a speaker to enable said human operator to hear said questions.

17. The system of claim 14, further comprising a microphone connected to said control computer for capturing voice data issued by said human operator and intended for said user; and wherein said computer is operable to transmit said voice data to said computer associated with said user over said communications network; and wherein said computer associated with said user comprises a speaker to enable said user to hear said voice data issued by said human operator.

18. The system of claim 14, wherein said computer associated with said user is operable to transmit a copy of said images viewed by said user to said control computer over said communications network; and wherein said control computer is operable to display said images, thereby enabling said human operator to scan and animate said images viewed by said user.

19. The system of claim 14, further comprising at least one database connected to said control computer containing multimedia data, said multimedia data comprising at least one of the following: text, images, sound, videos, or 3D animation sequences, thereby enabling said human operator to respond to questions posed by said user and transmit information to said user.

20. The system of claim 14, wherein at least one virtual object appears in the form of a stylized graphic personage in three dimensions.

21. The system of claim 20, wherein said personage symbolizes a product, a service, a trademark, a business or a collective for which said personage performs the service of informing, promoting or selling.

22. The system of claim 20, wherein said personage is animated wit graphic expressions including animations of the lips and eyes and vocal expressions including intonations; and wherein said graphical and vocal expressions are controlled and produced by said human operator via said control computer, and express reactions of said personage to comportment, needs and expectations of said user.

23. The system of claim 20, wherein said personage controlled by said human operator is mobile on said images, varies in size, shape and colors, and gestures with head, arm and leg movements based on zones of said images and contextual relationships between said user and said human operator on whose behalf said personage acts.

24. The system of claim 23, wherein said personage comprises accessories for providing expressions and gestures to said personage, and moving and shifting said personage by said human operator according to the development of said contextual relationship.

25. The system of claim 24, wherein said personage comprises activation means to activate zones of said images by said human operator.

26. The system of claim 14, wherein said control computer is situated in a call center said human operator's home.

* * * * *